(12) United States Patent
Connelly

(10) Patent No.: US 8,429,684 B2
(45) Date of Patent: Apr. 23, 2013

(54) METHODS AND APPARATUSES FOR DETERMINING PREFERRED CONTENT USING A TEMPORAL METADATA TABLE

(75) Inventor: Jay H. Connelly, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1666 days.

(21) Appl. No.: 10/155,661

(22) Filed: May 24, 2002

(65) Prior Publication Data
US 2003/0221196 A1 Nov. 27, 2003

(51) Int. Cl.
H04H 60/33 (2008.01)
H04H 60/45 (2008.01)
H04H 60/32 (2008.01)
H04N 7/16 (2011.01)
H04N 7/173 (2011.01)

(52) U.S. Cl.
USPC ........ 725/28; 725/9; 725/11; 725/13; 725/14; 725/15; 725/19; 725/20; 725/21; 725/110

(58) Field of Classification Search .................. 725/110, 725/9–11, 13–15, 19–21, 28
See application file for complete search history.

(56) References Cited

U.S. PATENT DOCUMENTS

| 5,410,344 A * | 4/1995 | Graves et al. .................... 725/46 |
| 5,664,046 A * | 9/1997 | Abecassis ...................... 386/125 |
| 5,790,935 A * | 8/1998 | Payton ............................. 725/91 |
| 6,295,092 B1 * | 9/2001 | Hullinger et al. ............. 348/468 |
| 6,463,207 B1 * | 10/2002 | Abecassis ...................... 386/261 |
| 2002/0059637 A1 * | 5/2002 | Rakib ............................ 725/119 |
| 2003/0067554 A1 * | 4/2003 | Klarfeld et al. ............... 348/461 |
| 2003/0093790 A1 * | 5/2003 | Logan et al. ..................... 725/38 |
| 2003/0101104 A1 * | 5/2003 | Dimitrova et al. .............. 705/27 |
| 2004/0025180 A1 * | 2/2004 | Begeja et al. ................... 725/46 |
| 2007/0250846 A1 * | 10/2007 | Swix et al. ...................... 725/10 |

* cited by examiner

Primary Examiner — Pankaj Kumar
Assistant Examiner — Alazar Tilahun
(74) Attorney, Agent, or Firm — Kacvinsky Daisak PLLC

(57) ABSTRACT

A broadcast system, method and apparatus providing content on demand. Embodiments of the present invention provide methods and apparatuses for rating content to be broadcast or to be broadcast potentially from a server. Additional aspects of particular embodiments of the invention provide methods and apparatuses for automatically managing storage resources of client systems. For one embodiment of the present invention, a user consumes a number of data files each having an associated temporal metadata table (TMDT). Each TMDT contains a plurality of time-indexed entries, each entry containing metadata describing a segment of the corresponding data file. The TMDT and user interaction during consumption of a one or more data files are used to create a preference profile table (PPT) for the user. The PPT is stored at the client system and is used to evaluate subsequent content. Such evaluation is used to determine broadcast schedules or automatically manage storage resources.

10 Claims, 8 Drawing Sheets

(300)

| Time | Meta Data |
|---|---|
| 1. 0 Sec. | (Genre: Action) (Location: Paris) (Actor: Jones) |
| 2. 15 Sec. | (Genre: Action) (Location: New York) (Actor: Smith) |
| 3. 100 Sec. | (Genre: Suspense) (Location: New York) (Actor: Smith) |
| 4. 500 Sec. | (Genre: Violence) (Location: Detroit) (Actor: Jones) |
| 5. 1350 Sec. | (Genre: Action) (Location: Paris) (Actor: Smith) |

Fig. 3

| ATTRIBUTE | ATTRIBUTE VALUE | RELEVANCE | BELIEVABILITY |
|---|---|---|---|
| ACTOR | JOE SMITH | 0 | 0 |
| ACTOR | JANE DOE | 0 | 0 |
| GENRE | ACTION | 0 | 0 |
| GENRE | COMEDY | 0 | 0 |

Fig. 5

| ATTRIBUTE | ATTRIBUTE VALUE | RELEVANCE | BELIEVABILITY |
|---|---|---|---|
| ACTOR | JOE SMITH | 1 | 1 |
| ACTOR | JANE DOE | -1 | 0 |
| GENRE | ACTION | 1 | 1 |
| GENRE | COMEDY | -1 | 0 |

Fig. 5A

METHODS AND APPARATUSES FOR DETERMINING PREFERRED CONTENT USING A TEMPORAL METADATA TABLE

FIELD

Embodiments of the present invention relate generally to broadcast systems and, more specifically, to determining preferred content using temporal metadata and personal preference profiles.

BACKGROUND

Broadcast systems traditionally transmit data in one direction from a server system to a plurality of client systems. Users of the client systems typically consume the signals received from the server system as they are broadcast. A concern for broadcasters is determining what content to broadcast. Currently it is difficult for most users of the client systems to provide feedback to broadcasters with regard to programming. For example, many of today's television program broadcasters rely upon Neilson ratings to determine broadcast programming and/or scheduling. Neilson ratings are generally based upon only a small sampling of a cross-section of the public. Broadcaster may also consider user reaction to content metadata. For example, content databases can provide metadata describing a wide range of films. Such metadata does not take into account that some portions of the content may be of interest to particular users while other portions may not be. This may yield an average rating for the entire content but cannot be used to determine the specific portions of the content that are of interest. Consequently, most television viewers have relatively little impact on broadcast schedules and/or content.

Once broadcasters have determined which content to broadcast, individual users may wish to capture (store) a limited subset of the broadcast content that is of interest to them. For example, a user may record a desired television program on a videocassette recorder (VCR) or store a digital broadcast on the internal hard drive of a digital video recorder. Typically, a user is required to explicitly set the criteria used (e.g. date, time) to determine which broadcasts are stored.

BRIEF DESCRIPTION OF THE DRAWINGS

The present invention is illustrated by way of example and not limitation in the accompanying figures.

FIG. 3 illustrates a temporal metadata table in accordance with one embodiment of the present invention;

FIGS. 5 and 5A illustrate an exemplary PPT in accordance with one embodiment of the present invention;

DETAILED DESCRIPTION

Alternative embodiments of the present invention provide methods and apparatuses for rating content to be broadcast or to be broadcast potentially from a server. Additional aspects of particular embodiments of the invention provide methods and apparatuses for automatically managing storage resources of client systems.

For one embodiment of the present invention, a user consumes a number of programs each having an associated temporal metadata table (TMDT). The TMDT and user interaction during consumption of the program content are used to create a preference profile table (PPT) for the user. The PPT is stored at the client system and is used to evaluate subsequent content. The broadcaster subsequently broadcasts a TMDT for all potential broadcast content. Each TMDT is mapped to the PPT in order to score or rate the content associated with the TMDT. The broadcaster uses an aggregate of scores from many users to determine whether or not to broadcast the particular content. Thus, the broadcaster determines a broadcast schedule.

For one embodiment of the present invention, the PPT on each client system is used to automatically manage the storage resources of the particular client system. As content is broadcast, the associated TMDT is mapped to a user's PPT. Each broadcast program is rated and the rating is used to determine which programs will be stored.

In the following detailed description of exemplary embodiments of the present invention, numerous specific details are set forth in order to provide a thorough understanding of the described embodiments of the present invention. However, it will be apparent to one skilled in the art that alternative embodiments of the present invention may be practiced without these specific details. In some instances, well-known structures and devices are shown in block diagram form, rather than in detail, in order to avoid obscuring the description of exemplary embodiments of the present invention.

Figure 1:
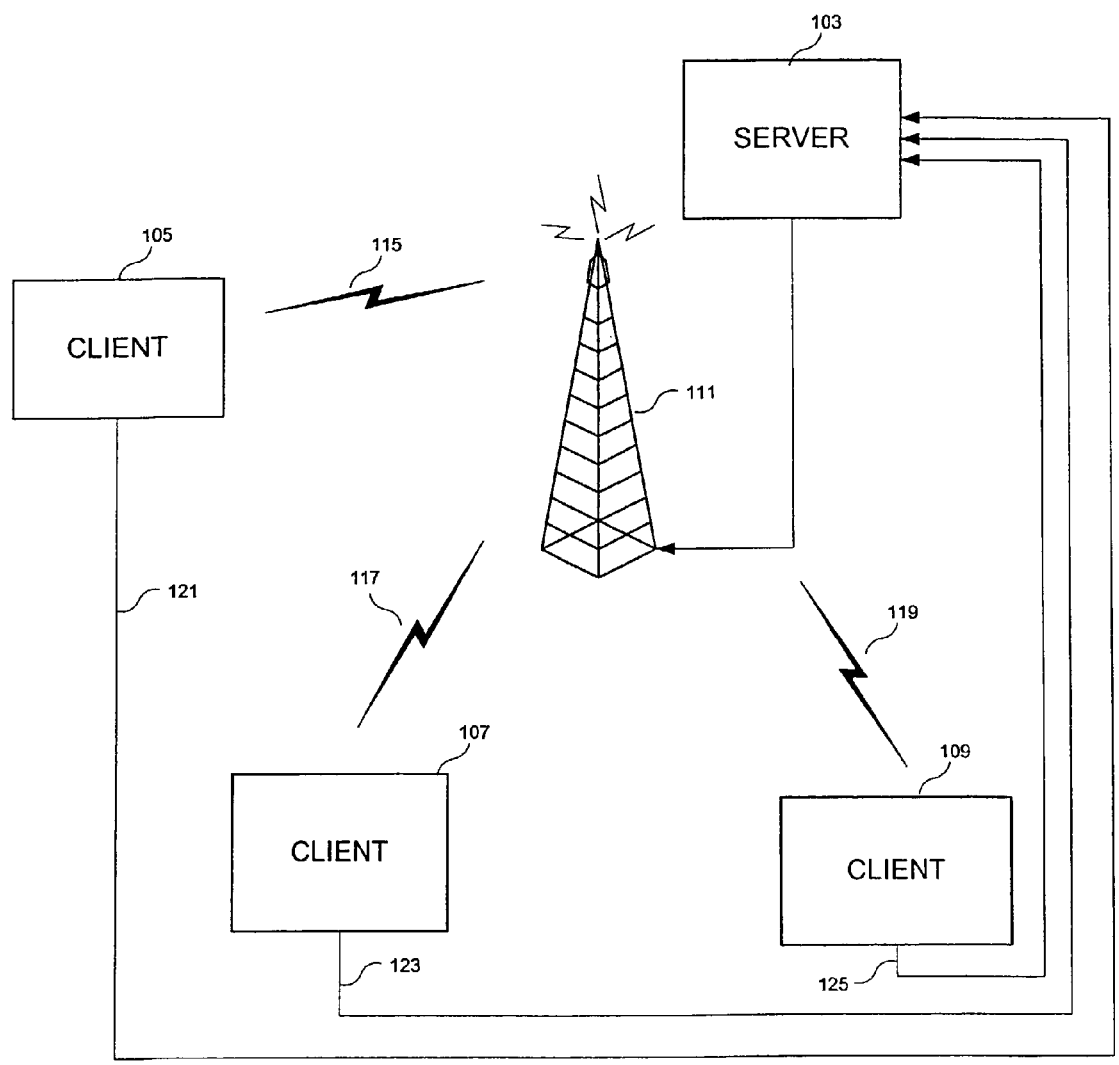
FIG. 1 is a block diagram illustrating one embodiment of a broadcast system in accordance with one embodiment of the present invention.

FIG. 1 is an illustration of a broadcast system in accordance with one embodiment of the present invention. As shown in FIG. 1, a server 103 is configured to broadcast information to a plurality of clients 105, 107 and 109. In the embodiment shown in FIG. 1, client 105 receives a broadcast from server 103 through a link 115 from a broadcast antenna 111. Similarly, client 107 receives a broadcast from server 103 through a link 117 and client 109 receives a broadcast from server 103 through a link 119 from broadcast antenna 111. In one embodiment of the invention, links 115, 117 and 119 are uni-directional wireless radio frequency (RF) links from broadcast antenna in a format such as for example, but not limited to known amplitude modulation (AM) or frequency modulation (FM) radio signals, television (TV) signals, digital video broadcast (DVB) signals or the like, which are broadcast through the atmosphere.

Server 103 is configured to broadcast a plurality of data files, which may be received by clients 105, 107 and 109. The data files may be any combination of a number of different types of files including for example video, audio, graphics, text, multi-media or the like. For example the data files may be audio/video files, such as programs with moving images and sound. However, it will be appreciated that the data files broadcast in accordance with the teachings of various embodiments of the present invention are not limited only to audio/video files. For example, the data files may be the TMDT associated with such programs.

As shown in FIG. 1, clients 105, 107, and 109, are linked with server 103 with communication links 121, 123, and 125, respectively. Links 121, 123, and 125, are used by clients 105, 107 and 109, respectively, to send information back to server 103. For example, ratings for potential broadcast content may be transmitted from the clients to the server via links 121, 123, and 125, in accordance with an embodiment of the present invention.

Although links 121, 123 and 125 are illustrated in FIG. 1 as direct links between clients 105, 107, and 109 and server 103, it is appreciated that clients 105, 107 and 109 may communicate information to server 103 through indirect links including but not limited to broadcasted wireless signals, network communications or the like.

Figure 1A:
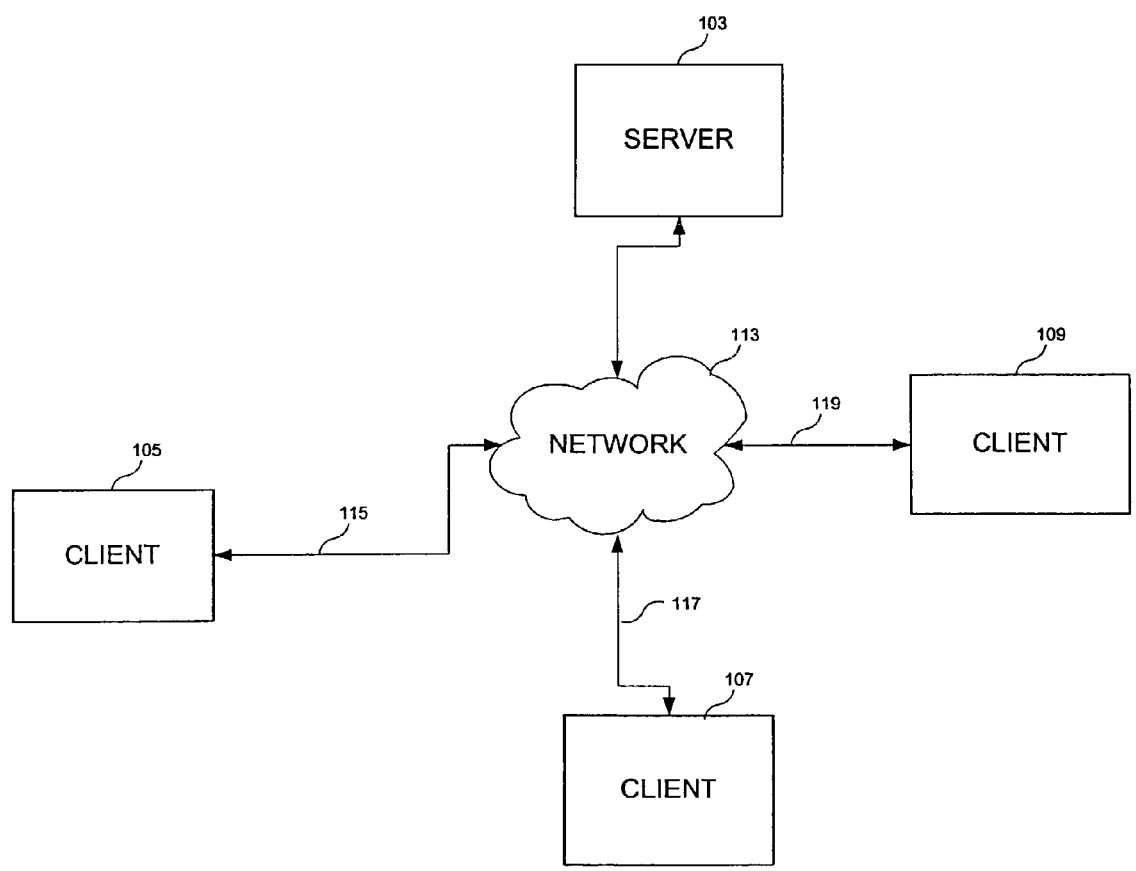
FIG. 1A is a block diagram illustrating an alternative embodiment of a broadcast system in accordance with one embodiment of the present invention.

FIG. 1A is an illustration of a broadcast system in accordance with an alternative embodiment of the present invention. As shown in FIG. 1A, bi-directional links 115, 117 and 119 enable clients 105, 107 and 109 to communication information to server 103. The communication between the server 103 and clients 105, 107 and 109 is effected through a network 113. In one embodiment of the invention, network 113 may be any type of communications network through which a plurality of different devices may communicate such as for example but not limited to the Internet, a wide area network (WAN), a local area network (LAN), an intranet, or the like.

Figure 2:
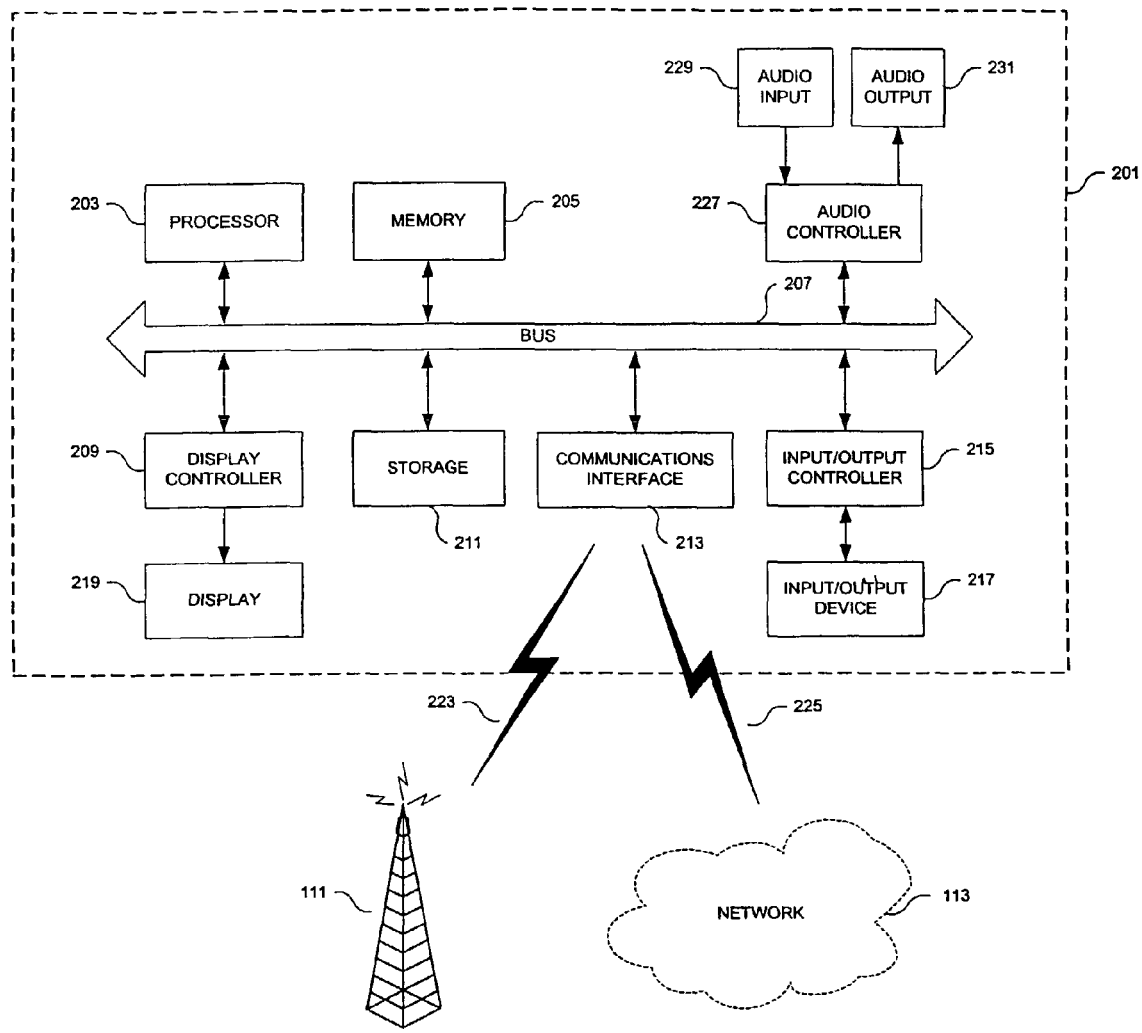
FIG. 2 is a block diagram of one embodiment of a processing system representative of a client or a server in accordance with one embodiment of the present invention.

FIG. 2 is a block diagram illustrating one embodiment of a processing system 201 that may be used for the server 103, or clients 105, 107 or 109 in accordance with an embodiment of the present invention. For alternative embodiments of the present invention, processing system 201 may be a computer or a set top box that includes a processor 203 coupled to a bus 207. In one embodiment, memory 205, storage 211, display controller 209, communications interface 213, input/output controller 215 and audio controller 227 are also coupled to bus 207.

Processing system 201 interfaces to external systems through communications interface 213. Communications interface 213 may include a radio transceiver compatible with AM, FM, TV, digital TV, DVB, wireless telephone signals or the like. Communications interface 213 may also include an analog modem, Integrated Services Digital Network (ISDN) modem, cable modem, Digital Subscriber Line (DSL) modem, a T-1 line interface, a T-3 line interface, an optical carrier interface (e.g. OC-3), token ring interface, satellite transmission interface, a wireless interface or other interfaces for coupling a device to other devices.

For one embodiment of the present invention, a carrier wave signal 223 is received by communications interface 213 to communicate with antenna 111. In one embodiment of the present invention, carrier wave signal 225 is received/transmitted between communications interface 213 and network 113. In one embodiment of the present invention, a communications signal 225 may be used to interface processing system 201 with another computer system, a network hub, router or the like. In one embodiment of the present invention, carrier wave signals 223 and 225 are considered to be machine readable media, which may be transmitted through wires, cables, optical fibers or through the atmosphere, or the like.

In one embodiment of the present invention, processor 203 may be a conventional microprocessor, such as for example but not limited to an Intel x86 or Pentium family microprocessor, a Motorola family microprocessor, or the like. Memory 205 may be a machine-readable medium such as dynamic random access memory (DRAM) and may include static random access memory (SRAM). Display controller 209 controls in a conventional manner a display 219, which in one embodiment of the invention may be a cathode ray tube (CRT), a liquid crystal display (LCD), an active matrix display, a television monitor or the like. The input/output device 217 coupled to input/output controller 215 may be a keyboard, disk drive, printer, scanner and other input and output devices, including a television remote, mouse, trackball, trackpad, joystick, or the like. In one embodiment of the present invention, audio controller 227 controls in a conventional manner audio output 231, which may include for example audio speakers, headphones, an audio receiver, amplifier or the like. In one embodiment of the invention, audio controller 227 also controls in a conventional manner audio input 229, which may include for example a microphone or input(s) from an audio or musical device, or the like.

Storage 211 may include machine-readable media such as for example but not limited to a magnetic hard disk, a floppy disk, an optical disk, a smart card or another form of storage for data. In one embodiment of the present invention, storage 211 may include removable media, read-only media, readable/writable media or the like. Some of the data may be written by a direct memory access process into memory 205 during execution of software in computer system 201. It is appreciated that software may reside in storage 211, memory 205 or may be transmitted or received via modem or communications interface 213. For the purposes of the specification, the term "machine readable medium" shall be taken to include any medium that is capable of storing data, information or encoding a sequence of instructions for execution by processor 203 to cause processor 203 to perform the methodologies of the present invention. The term "machine readable medium" shall be taken to include, but is not limited to solid-state memories, optical and magnetic disks, carrier wave signals, and the like.

In one embodiment of the present invention, a broadcast system, such as that illustrated in FIG. 1, is configured to have a server broadcast a plurality of data files, each having an associated TMDT, to a plurality of clients. The TMDT contains a set of descriptors or attribute values that describe segments of the data file content. As will be discussed in greater detail below, the TMDT provides information that enables each client system to create a PPT.

In accordance with one embodiment of the present invention, the TMDT of subsequent potential broadcast data files is mapped to the PPTs to rate the potential broadcast data files. Such ratings are communicated to the server and used by the broadcaster to determine broadcast schedules and content of future server broadcasts. As will be discussed, various embodiments of the present invention utilize the TMDT and the PPT for client-side filtering, storage management and other personalization techniques as well as.

Temporal Metadata Table (TMDT)

A TMDT, in accordance with one embodiment of the present invention, is created by temporally segmenting a piece of content (a data file) and using metadata to describe each segment of the content separately. FIG. 3 illustrates a TMDT in accordance with one embodiment of the present invention. Table 300, shown in FIG. 3, includes five entries, 1-5. Each entry has a time index indicating the starting point of a data file segment. The starting point of each segment is relative to the beginning of the data file. Each entry also contains metadata relevant to the time index for that entry.

The metadata may describe the segment of the data file in various ways. For example, metadata may be based upon the primary defining attributes of the segment it describes. Such attributes may include genre (e.g., action, suspense, comedy, etc), scene location, and actor. For each attribute noted, a value is specified. For example, entry 1 of FIG. 3 has a time index of 0 sec. indicating the beginning of a movie. The metadata associated with entry 1 describes the segment of the data file as having an action genre, taking place in Paris, with actor Jones. That is, the attribute genre has a value of action; the attribute location has a value of Paris; and the attribute actor has a value of Jones. Entry 2 has a time indicator of 15 sec. which indicates that 15 seconds into the movie the metadata has changed. The genre remains action, but the location has changed to New York and the actor to Smith. Entry 3 indicates that at 100 seconds the genre has changed to suspense. The entire film is segmented in this way and appropriate descriptive metadata is generated for each segment. Thus, a TMDT provides a more detailed description for each segment of the data file than metadata that describes the data file content as a whole.

The data file may be segmented in various ways according to alternative embodiments of the invention. For example, segments may be of a specific or varying time duration or the data file may be segmented by scenes (a unit of continuous action in a film comprising one or more shots), I-frames, or some other unit. For example, the data file may be segmented whenever there is a change in one or more attributes.

The number of entries in a TMDT is dependent upon the length of the data file, the amount of granularity required, and the frequency with which the metadata changes. For example, a TMDT for a movie may have an entry for each scene, or even multiple entries per scene. Therefore, a TMDT for a typical full-length feature film may have hundreds of entries.

In accordance with one embodiment of the invention, the processing system is configured to process a TMDT with varying formats and number of entries. This allows different approaches in creating a TMDT for differing content and also allows the TMDT to be refined over time both in terms of the number of entries and the descriptor values.

Figure 4:
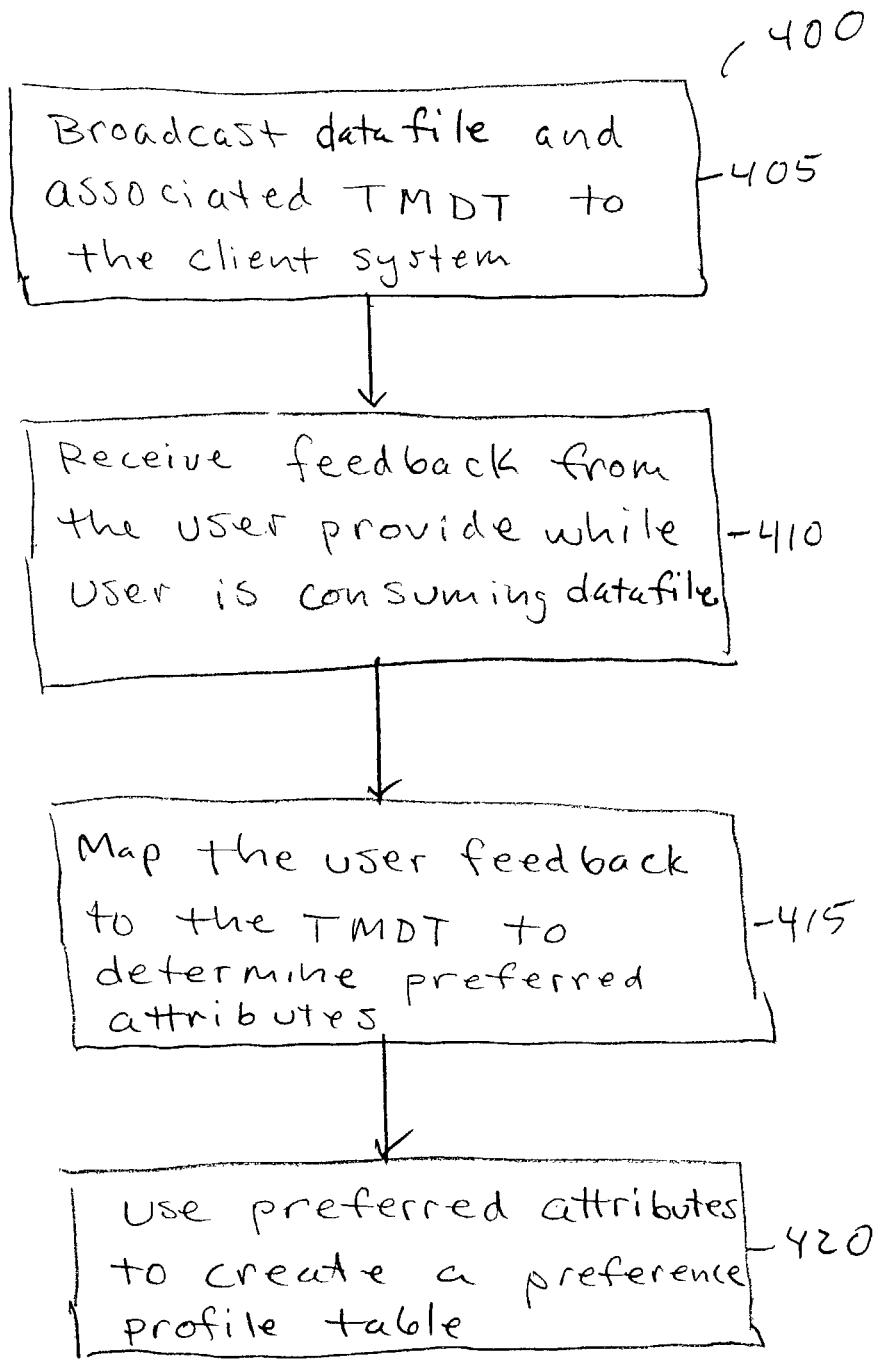
FIG. 4 is a process flow diagram that illustrates the process of creating a preference profile table (PPT) using a TMDT in accordance with one embodiment of the present invention.

The TMDT may be used to create a PPT in accordance with an embodiment of the present invention. FIG. 4 is a process flow diagram that illustrates the process of creating a PPT using a TMDT in accordance with one embodiment of the present invention. Process 400, shown in FIG. 4, begins at operation 405 in which a data file and its associated TMDT is broadcast to a user. For one embodiment of the invention, the TMDT is created prior to broadcast by automatically extracting features from the data file. The TMDT is then broadcast with its associated data file. The mapping of the TMDT to its associated data file is maintained at the client system. For alternative embodiments of the invention the TMDT may be broadcast separately, and then associated with the data file at the time of consumption.

At operation 410, feedback is received from the user. The feedback is provided while the user is consuming the data file. One embodiment of the present invention, employs a mechanism through which the user provides feedback during the consumption of the data file. That is, at any point during the consumption of the data file the user may provide feedback about how much he likes or dislikes what he is currently consuming. For example, if the user was viewing a movie, the feedback may relate to a particular scene. If the user was listening to music, the feedback may relate to a particular score. Such feedback may be provided explicitly through use of a remote control or keyboard for example. Implicit mechanisms (e.g., biometric feedback) may also be employed.

At operation 415, the user feedback is mapped against the TMDT to determine the user's preferred attributes. For one embodiment of the invention, when the user input is received, a process will capture the time at which the feedback was supplied. This time is correlated with the TMDT. For example, suppose a user is consuming the data file associated with the TMDT of FIG. 3. If the user indicates a preference for the currently presented data file segment, and that indication occurs at 55 sec., the system would determine that something in the corresponding attributes contained in the TMDT appeals to the user. That is, the system determines that, either an action genre, location of New York, or the actor Smith, or some combination of these attributes appeals to the user.

The user's feedback may also indicate a dislike for the particular segment. The system would then determine the corresponding attributes of the segment to make inferences regarding attributes that the user does not like.

The relevance of this feedback may be determined by trial and error, or other methods, to understand which attributes, or combinations thereof, the user is responding to.

At operation 420, the attributes representing the user's preferences are used to create a PPT that is stored on the client system. An exemplary PPT in accordance with one embodiment of the present invention is described below in reference to FIGS. 5 and 5A.

Preference Profile Table (PPT)

FIGS. 5 and 5A illustrate an exemplary PPT which may be updated and maintained locally by each client in accordance with one embodiment of the present invention. As an example, PPT 500, shown in FIG. 5, has been populated with attribute-value pairs of TMDT 300 of FIG. 3 which were broadcasted earlier from server as described in reference to FIG. 4. The PPT contains the attributes that the user has shown a preference (or dislike) for. The PPT may also contain corresponding relevance values and believability factors.

The relevance values of PPT 500 are indicators as to how relevant the associated attribute-value pair is for predicting the particular user's behavior. The relevance value indicates how likely it is for the user to prefer particular content containing a attribute value. For one embodiment of the present invention, relevance values are within a range of values such as for example from −10 to 10.

The believability factors in PPT 500 are weighting factors to be applied to specific attributes and attribute-value pairs when rating or predicting whether a user will actually access a particular data file containing those attribute values. For one embodiment of the present invention, believability factors are within a range of values such as for example from −10 to 10. In one embodiment of the invention, the believability factors may be increased for example when an attribute value accurately predicts a data file in which the user is interested. Conversely, the believability factors may be decreased when a user is interested in the data file, even though the particular attribute value indicates otherwise.

Initially the relevance values and believability factors may be zero as shown in FIG. 5, and subsequently updated in response to user feedback as shown in FIG. 5A.

For one embodiment of the present invention, the PPT is constructed from the aggregation of all data files and associated TMDTs that the user consumes. Alternatively, or additionally, the PPT may be updated based on explicit user actions such as an update request or accessing particular data files. The PPT once constructed may be updated on a periodic or continual basis.

In accordance with one embodiment of the present invention, a broadcaster can use the TMDT of potential broadcast data files together with the individual PPTs stored on client systems to determine broadcast schedules.

Figure 6:
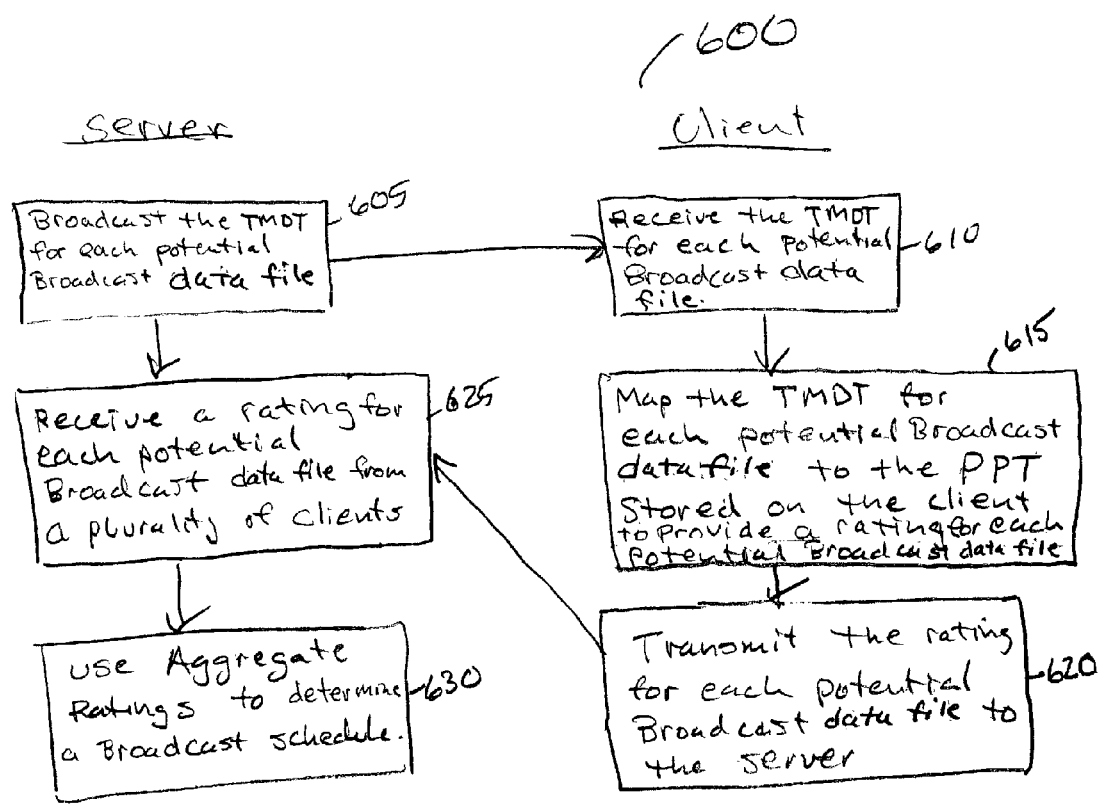
FIG. 6 is a process flow diagram that illustrates the process of determining a broadcast schedule in accordance with one embodiment of the present invention.

FIG. 6 is a process flow diagram that illustrates the process of determining a broadcast schedule using the TMDTs of potential broadcast data files and the individual PPTs of a number of users in accordance with one embodiment of the present invention.

Process 600, shown in FIG. 6, begins at operation 605 in which the server broadcasts the TMDT for each potential broadcast data file to a plurality of clients. At operation 610 the TMDTs for each potential broadcast data file is received by one or more client systems.

At operation 615 the client system maps each of the TMDT to the PPT stored on the client to create a rating for each potential broadcast data file. That is, the attribute-value pairs contained in the TMDT for a given potential broadcast data file are correlated with the user's preferences contained in the PPT. The rating then, is an indication of whether the user will prefer the data file associated with a given TMDT based on the user's indicated preferences in regard to previously consumed data files. Because the PPT has been created and stored on the client, the mapping of the TMDT and the PPT can be done automatically with no interaction from the user.

At operation 620 the rating for each potential broadcast data file is transmitted to the server. At operation 625 the server receives the ratings from a plurality of client systems.

The server uses the aggregate ratings from the plurality of clients to determine a broadcast schedule at operation 630. That is a broadcaster may choose to broadcast the data file that is, in aggregate, most highly rated. Alternatively, aggregate ratings may be only one of many factors affecting a decision to broadcast particular data files.

Individual or aggregate ratings and/or PPTs may be provided to content producers in accordance with one embodiment of the present invention. Such information may assist content producers in determining or tailoring content.

In addition to being used, in conjunction with a TMDT, to determine broadcast schedules, the PPT may be used to automatically manage the storage resources of the particular client system.

Figure 7:
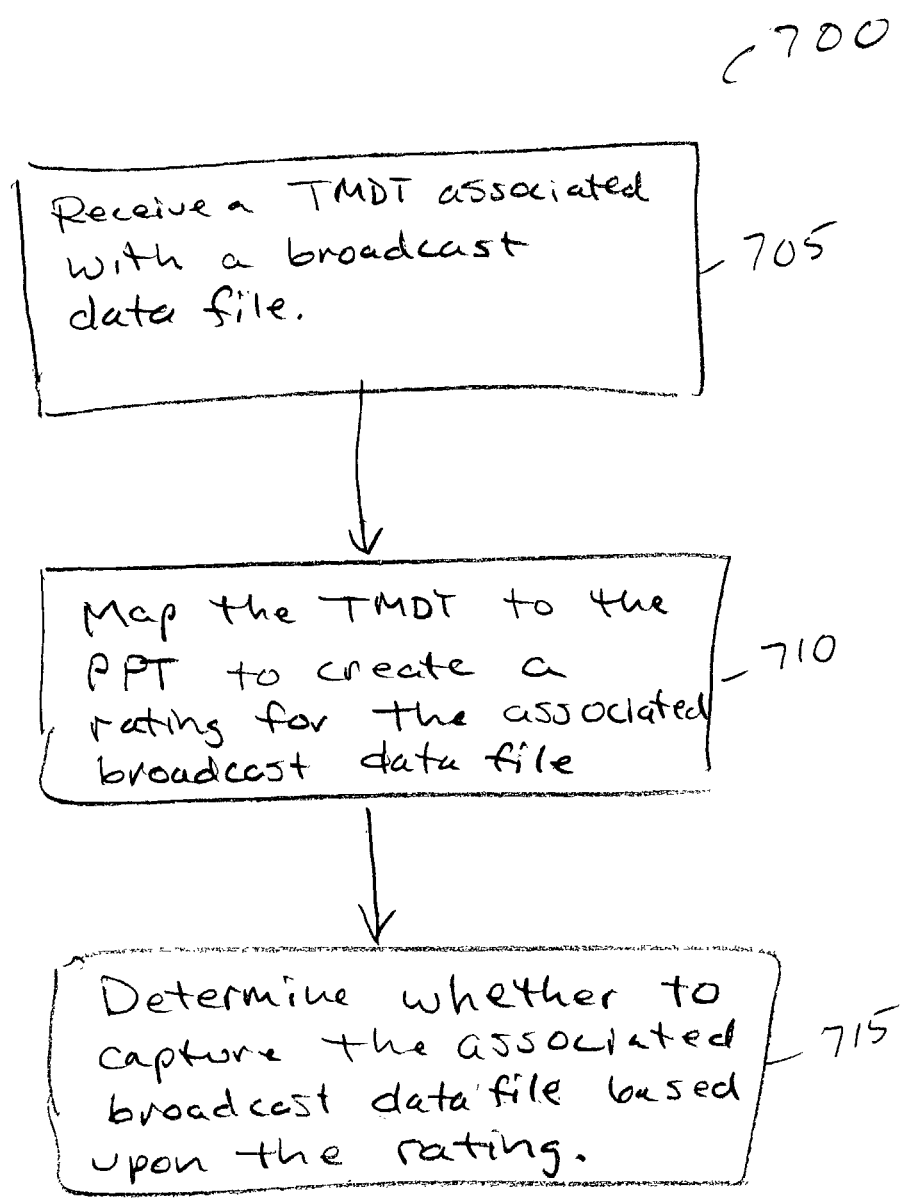
FIG. 7 is a process flow diagram that illustrates the process by which a PPT is used to automatically manage the storage resources of a client system in accordance with one embodiment of the present invention.

FIG. 7 is a process flow diagram that illustrates the process by which a PPT is used to automatically manage the storage resources of a client system in accordance with one embodiment of the present invention.

Process 700, shown in FIG. 7, begins at operation 705 in which a client system receives a TMDT associated with a broadcast data file. The TMDT may be received by itself, or with its associated broadcast data file.

At operation 710, the client system compares the TMDT with the PPT stored on the client to create a rating for the associated broadcast data file. The rating is created as described above in reference to FIG. 6 and indicates whether the user will be interested in the broadcast data file.

At operation 715, the rating is used to automatically determine whether or not the data file should be stored. For example, a particular client system may have the capacity to store four feature length movies. If the storage capacity is reached, the system evaluates the ratings of each stored data file and may delete previously stored data files in order to store subsequently received data files having a higher rating. In this way the data files that the user is most interested in will be stored in favor of data files that are less interesting to the user.

For one embodiment of the present invention, the client system may be set with a threshold rating indicating that the user is not interested in data files having a lower rating. Any broadcast data files having a rating, as determined by a mapping of the TMDT to the PPT, that is below the threshold will not be captured regardless of available storage resources.

In the foregoing specification, the specific exemplary embodiments of the invention have been described. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:

broadcasting, to a user, a plurality of data files, each data file having associated therewith a temporal metadata table, the temporal metadata table having time indexed entries, each time indexed entry containing metadata including an attribute-value pair to describe a segment of the corresponding data file;

receiving feedback from the user and capturing a time at which the feedback is provided, the feedback indicating the user's preferences in regard to at least one segment of a first data file;

correlating the time of feedback with a time indexed entry in the temporal metadata table;

comparing the feedback with the metadata in the temporal metadata table referenced by the correlated time indexed entry to determine user preferences in terms of the metadata describing the at least one segment of the first data file; wherein the feedback is explicit feedback provided by the user during the presentation of the first data file;

using the user's preferences in terms of metadata to create a user preference profile table, the user preference profile table including at least one entry, each entry comprising: the attribute-value pair, a relevance value indicating relevance of the attribute-value pair in predicting user behavior, wherein the relevance value indicates the likelihood that the user will prefer a segment having the attribute-value pair, and an adjustable believability factor to be applied as a weighting factor to the attribute-value pair to predict a probability of the user accessing a data file having the attribute-value pair;

creating a rating for each data file by correlating the associated temporal metadata table with the user preference profile table;

broadcasting, to a plurality of users, a plurality of temporal metadata tables, each temporal metadata table associated with a corresponding data file;

receiving, from one or more users, one or more ratings for a second data file;

determining a broadcast schedule based on the one or more ratings for the second data file; and selecting at least one data file for broadcast based upon the broadcast schedule.

2. An apparatus comprising:

a processor having circuitry to execute instructions;

a communications interface coupled to the processor, to broadcast data from a server system to one or more client systems;

a storage device coupled to the processor, having executable instructions stored therein, which, when executed by the processor, cause the processor to broadcast a plurality of data files, each data file having associated therewith a temporal metadata table, the temporal metadata table having time indexed entries, each time indexed entry containing metadata including an attribute-value pair to describe a segment of the corresponding data file;

receive user feedback from one or more client systems, and capture a time at which the feedback is provided, the feedback indicating a user's preferences in regard to at least one segment of a first data file;

compare the feedback with the metadata in the temporal metadata table referenced by the correlated time indexed entry to determine user preferences in terms of the metadata describing the at least one segment of the first data file;

wherein the feedback is explicit feedback provided by the user during the presentation of the first data file;

use the user's preferences in terms of metadata to create a user preference profile table, the user preference profile table including at least one entry, each entry comprising: the attribute-value pair, a relevance value indicating relevance of the attribute-value pair in predicting user behavior, wherein the relevance value indicates the likelihood that the user will prefer a segment having the attribute-value pair, and an adjustable believability factor to be applied as a weighting factor to the attribute-value pair to predict a probability of the user accessing a data file having the attribute-value pair;

create a rating for each data file by correlating the associated temporal metadata table with the user preference profile table;

broadcast, to a plurality of client systems, a plurality of temporal metadata tables, each temporal metadata table associated with a corresponding data file;

receive, from one or more client systems, one or more ratings for a second data file;

determine a broadcast schedule based on the one or more ratings for the second data file; and select at least one data file for broadcast based upon the broadcast schedule.

3. A method comprising:

receiving a temporal metadata table, the temporal metadata table associated with a data file, the temporal metadata table having time indexed entries, each time indexed entry containing metadata including an attribute-value pair to describe a segment of the data file;

comparing the temporal metadata table to a user preference profile table, the user preference profile table indicating user preferences in terms of metadata describing at least one segment of the data file, the user preference profile table including at least one entry, each entry comprising: the attribute-value pair, a relevance value indicating relevance of the attribute-value pair in predicting user behavior, wherein the relevance value indicates the likelihood that the user will prefer a segment having the attribute-value pair, and an adjustable believability factor to be applied as a weighting factor to the attribute-value pair to predict a probability of the user accessing a data file having the attribute-value pair;

creating a rating for the data file by correlating the associated temporal metadata table with the user preference profile table;

automatically determining to store the data file based upon the rating, wherein automatically determining to store the data file based upon the rating includes automatically determining to discard one or more previously stored data files, if the previously stored data files have lower ratings than the data file; and transmitting one or more ratings for a second data file to a server operative to determine a broadcast schedule based on the one or more ratings for the second data file and select at least one data file for broadcast based upon the broadcast schedule;

wherein the user preferences contain explicit feedback provided by the user during the presentation of the data file, wherein a time of the feedback is captured when the feedback is provided, and the time of feedback is correlated with the time indexed entry in the temporal metadata table.

4. The method of claim 3, wherein the temporal metadata table is received with the data file associated therewith.

5. A non-transitory machine-readable storage medium that provides executable instructions which, when executed by a processor, cause the processor to perform a method comprising:

receiving a temporal metadata table, the temporal metadata table associated with a data file, the temporal metadata table having time indexed entries, each time indexed entry containing metadata including an attribute-value pair to describe a segment of the data file;

comparing the temporal metadata table to a user preference profile table, the user preference profile table indicating user preferences in terms of metadata describing at least one segment of the data file, the user preference profile table including at least one entry, each entry comprising: the attribute-value pair, a relevance value indicating relevance of the attribute-value pair in predicting user behavior, wherein the relevance value indicates the likelihood that the user will prefer a segment having the attribute-value pair, and an adjustable believability factor to be applied as a weighting factor to the attribute-value pair to predict a probability of the user accessing a data file having the attribute-value pair;

creating a rating for the data file by correlating the associated temporal metadata table with the user preference profile table;

automatically determining to store the data file based upon the rating, wherein automatically determining to store the data file based upon the rating includes automatically determining to discard one or more previously stored data files, if the previously stored data files have lower ratings than the data file; and transmitting one or more ratings for a second data file to a server operative to determine a broadcast schedule based on the one or more ratings for the second data file and select at least one data file for broadcast based upon the broadcast schedule;

wherein the user preferences contain explicit feedback provided by the user during the presentation of the data file, wherein a time of the feedback is captured when the feedback is provided, and the time of feedback is correlated with the time indexed entry in the temporal metadata table.

6. The non-transitory machine-readable storage medium of claim 5, wherein the temporal metadata table is received with the data file associated therewith.

7. An apparatus comprising:

a processor having circuitry to execute instructions;

a communications interface coupled to the processor, to receive broadcast data from a server;

a storage device coupled to the processor, having executable instructions stored therein, which, when executed by the processor, cause the processor to receive a temporal metadata table, the temporal metadata table associated with a data file, the temporal metadata table having time indexed entries, each entry containing metadata including an attribute-value pair to describe a segment of the data file;

compare the temporal metadata table to a user preference profile table, the user preference profile table indicating user preferences in terms of metadata describing at least one segment of the data file; the user preference profile table including at least one entry, each entry comprising: the attribute-value pair, a relevance value indicating relevance of the attribute-value pair in predicting user behavior, wherein the relevance value indicates the likelihood that the user will prefer a segment having the attribute-value pair, and an adjustable believability factor to be applied as a weighting factor to the attribute-value pair to predict a probability of the user accessing a data file having the attribute-value pair;

create a rating for the data file by correlating the associated temporal metadata table with the user's preference profile table;

automatically determine to store the data file based upon the rating, wherein automatically determining to store the data file based upon the rating includes automatically determining to discard one or more previously stored data files, if the previously stored data files have lower ratings than the data file; and transmit one or more ratings for a second data file to a server operative to determine a broadcast schedule based on the one or more ratings for the second data file and select at least one data file for broadcast based upon the broadcast schedule;

wherein the user preferences contain explicit feedback provided by the user during the presentation of the first data file, wherein a time of the feedback is captured when the feedback is provided, and the time of feedback is correlated with the time indexed entry in the temporal metadata table.

8. The apparatus of claim 7, wherein the temporal metadata table is received with the data file associated therewith.

9. A system comprising:

a server processing system configured to broadcast a plurality of data files and corresponding temporal metadata tables, each temporal metadata table having a plurality of time indexed entries, each time indexed entry containing metadata including an attribute-value pair to describe a segment of the corresponding data file; the server processing system is further configured to use preferences of a user to create a user preference profile table, the user preference profile table including at least one entry, each entry comprising: the attribute-value pair, a relevance value indicating relevance of the attribute-value pair in predicting user behavior, wherein the relevance value indicates the likelihood that the user will prefer a segment having the attribute-value pair, and an adjustable believability factor to be applied as a weighting factor to the attribute-value pair to predict a probability of the user accessing a data file having the attribute-value pair, the user preference profile table compared to subsequently broadcast temporal metadata tables associated with a potential broadcast data file to provide a rating for the potential broadcast data file, wherein the rating is used to determine a broadcast schedule and to determine whether to broadcast the potential broadcast data file according to the broadcast schedule;

a plurality of client processing systems configured to receive the plurality of data files and corresponding temporal metadata tables from the server processing system, the server processing system further configured to accept feedback from the user such that the user may provide feedback during the presentation of the data files, the feedback indicating the user's preferences in regard to metadata describing at least one segment of a data file, wherein a time of the feedback is captured when the feedback is provided, and the time of feedback is correlated with the time indexed entry in the temporal metadata table.

10. The system of claim 9, wherein the preference profile table is compared to a temporal metadata table, associated with a broadcast data file, to automatically determine to store the broadcast data file.

\* \* \* \* \*